(12) United States Patent
Uchida

(10) Patent No.: US 11,282,224 B2
(45) Date of Patent: Mar. 22, 2022

(54) INFORMATION PROCESSING APPARATUS AND INFORMATION PROCESSING METHOD

(71) Applicant: Sony Interactive Entertainment Inc., Tokyo (JP)

(72) Inventor: Masaki Uchida, Chiba (JP)

(73) Assignee: Sony Interactive Entertainment Inc., Tokyo (JP)

( * ) Notice: Subject to any disclaimer, the term of this patent is extended or adjusted under 35 U.S.C. 154(b) by 125 days.

(21) Appl. No.: 16/344,155

(22) PCT Filed: Dec. 1, 2017

(86) PCT No.: PCT/JP2017/043334
§ 371 (c)(1),
(2) Date: Apr. 23, 2019

(87) PCT Pub. No.: WO2018/105530
PCT Pub. Date: Jun. 14, 2018

(65) Prior Publication Data
US 2020/0265601 A1     Aug. 20, 2020

(30) Foreign Application Priority Data

Dec. 8, 2016  (JP) .............................. JP2016-238748

(51) Int. Cl.
*G06T 7/70* (2017.01)
*G06T 7/66* (2017.01)
*G06T 7/13* (2017.01)

(52) U.S. Cl.
CPC ................. *G06T 7/70* (2017.01); *G06T 7/13* (2017.01); *G06T 7/66* (2017.01); *G06T 2207/10012* (2013.01)

(58) Field of Classification Search
CPC ......... G01B 11/00; G01B 11/02; G01B 11/24; G06T 7/60; G06T 2207/10012;
(Continued)

(56) References Cited

U.S. PATENT DOCUMENTS 7,995,840 B2   8/2011 Lukac
8,994,721 B2   3/2015 Matsuda
(Continued)

FOREIGN PATENT DOCUMENTS

CN    101547370 A    9/2009
CN    102395948 A    3/2012
(Continued)

OTHER PUBLICATIONS

Chen et al. ("Color filter array interpolation by successive refinement over color channels using gradient inverse-weighted filtering." Optics Communications 318 (2014): 189-198 (Year: 2014).*
(Continued)

*Primary Examiner* — Pinalben Patel
(74) *Attorney, Agent, or Firm* — Matthew B. Dernier, Esq.

(57) ABSTRACT

A target object detection section detects the region of an image of a target object from a frame image captured as a moving image. A contour search section samples the values of pixels in four diagonal directions in a pixel array, using as a start point a pixel of which the corresponding element targets G (green) for observation in the region. The contour search section then detects coordinate point candidates on a contour line of the target object on the basis of changes in luminance Y of the sampled pixels. The contour search section filters the coordinate point candidates based on luminance changes in the color component of the target object. The contour search section causes the distribution of the coordinate points to approximate the contour line. A
(Continued)

position information generation section acquires position information regarding the target object in the real space using the gravity center and size of the target object image obtained from the contour line.

12 Claims, 12 Drawing Sheets

(58) Field of Classification Search
CPC .... G06T 7/66; G06T 7/70; G06T 7/13; G06T 7/73; G01C 3/06
See application file for complete search history.

(56) References Cited

U.S. PATENT DOCUMENTS

| | | | |
|---|---|---|---|
| 9,754,153 B2* | 9/2017 | Li | G06K 9/4652 |
| 10,133,941 B2 | 11/2018 | Zheng | |
| 2004/0016870 A1* | 1/2004 | Pawlicki | G06K 9/00805 250/208.1 |
| 2008/0205792 A1 | 8/2008 | Andersen | |
| 2009/0244333 A1* | 10/2009 | Lukac | H04N 9/04557 348/280 |
| 2011/0235899 A1* | 9/2011 | Tanaka | H04N 13/243 382/154 |
| 2012/0032955 A1 | 2/2012 | Matsuda | |
| 2015/0241611 A1 | 8/2015 | Hirota | |
| 2017/0248971 A1* | 8/2017 | Wei | G05D 1/0094 |
| 2018/0033148 A1 | 2/2018 | Zheng | |

FOREIGN PATENT DOCUMENTS

| | | |
|---|---|---|
| CN | 106067026 A | 11/2016 |
| CN | 106203398 A | 12/2016 |
| EP | 1067801 A2 | 1/2001 |
| JP | 07121710 A | 5/1995 |
| JP | 08105720 A | 4/1996 |
| JP | 08178637 A | 7/1996 |
| JP | 2001014476 A | 1/2001 |
| JP | 2005027077 A | 1/2005 |
| JP | 2009246963 A | 10/2009 |
| KR | 1020080032746 A | 4/2008 |
| KR | 101660447 B1 | 9/2016 |
| KR | 101907451 B1 | 10/2018 |
| WO | 2007050885 A2 | 5/2007 |

OTHER PUBLICATIONS

International Search Report for correspodning PCT Application No. PCT/JP2017/043334, 4 pages, dated Feb. 27, 2018.
International Preliminary Report on Patentability and Written Opinion for corresponding PCT Application No. PCT/JP2017/043334, 14 pages, dated Jul. 12, 2018.
The first office action for corresponding CN Application No. 201780074482.7, 13 pages, dated Jun. 15, 2020.
Extended Search Report for corresponding EP Application No. 17879251.1, 10 pages, dated Jun. 29, 2020.
Christopher H. Lampert. et al., "Real-Time detection of colored objects in multiple camera streams with iff-the-shelf-hardware components" Journal of Real Time-Image Processing, vol. 7, No. 1, pp. 31-41, Jul. 31, 2010.
Notice of Allowance for corresponding KR Application No. 10-2019-7016547, 3 pages, dated Dec. 18, 2020.

* cited by examiner

F I G . 4
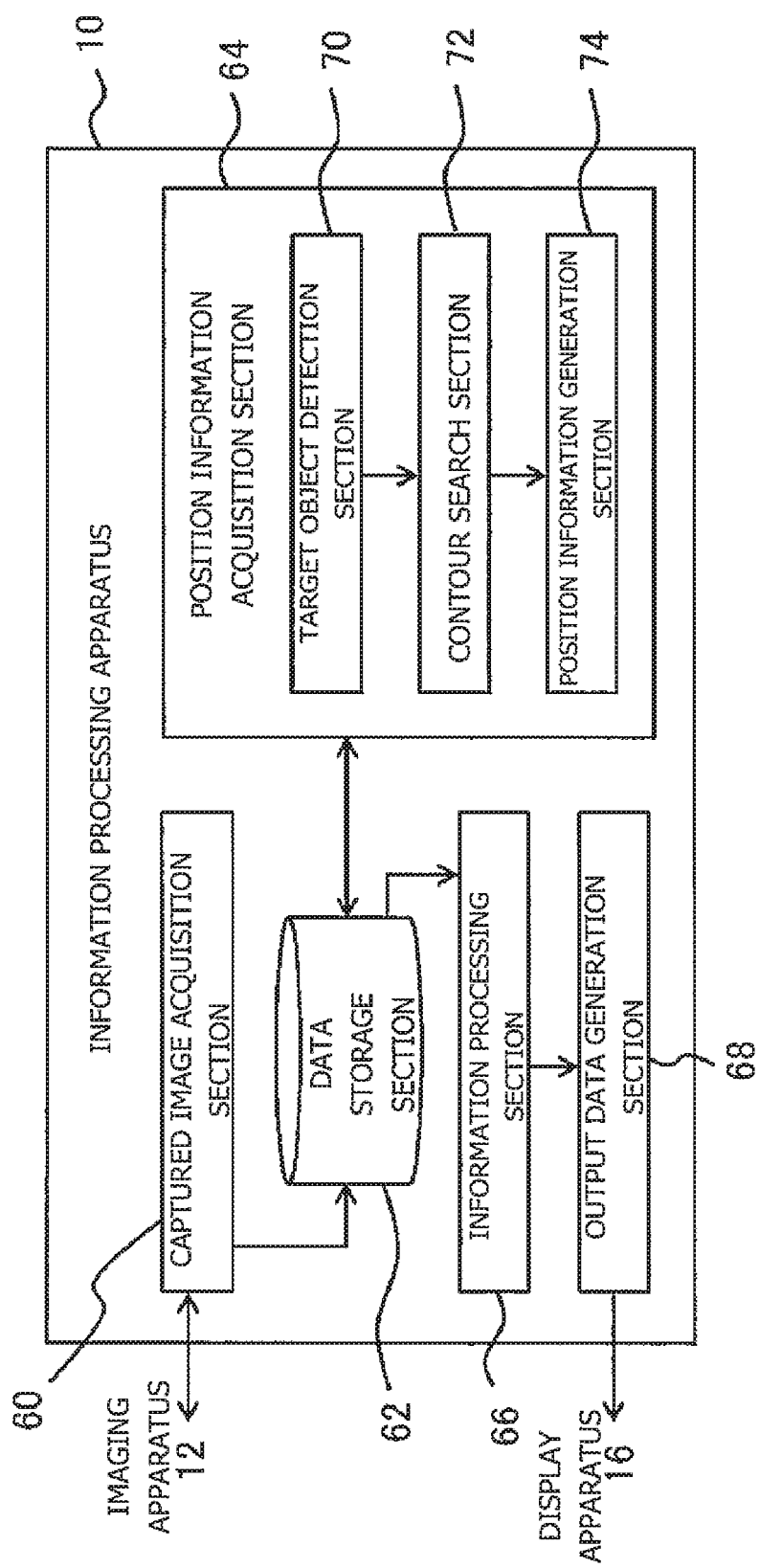

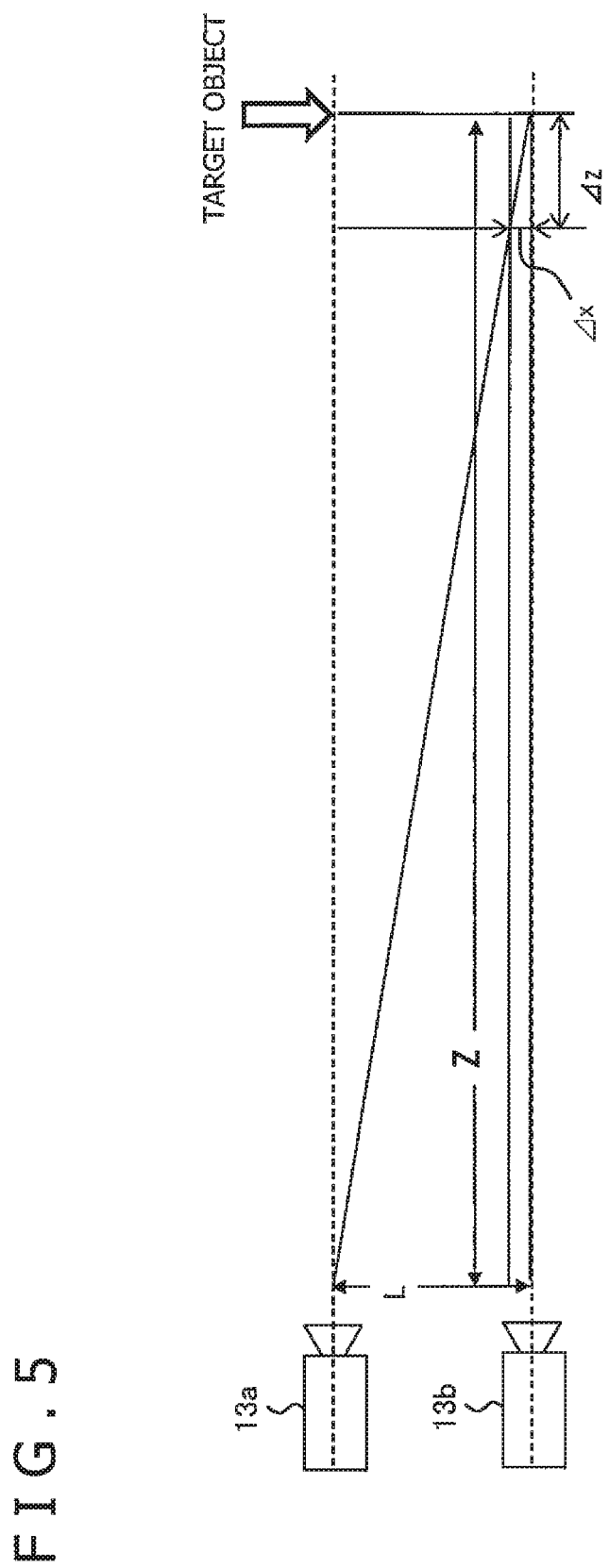
F I G. 5

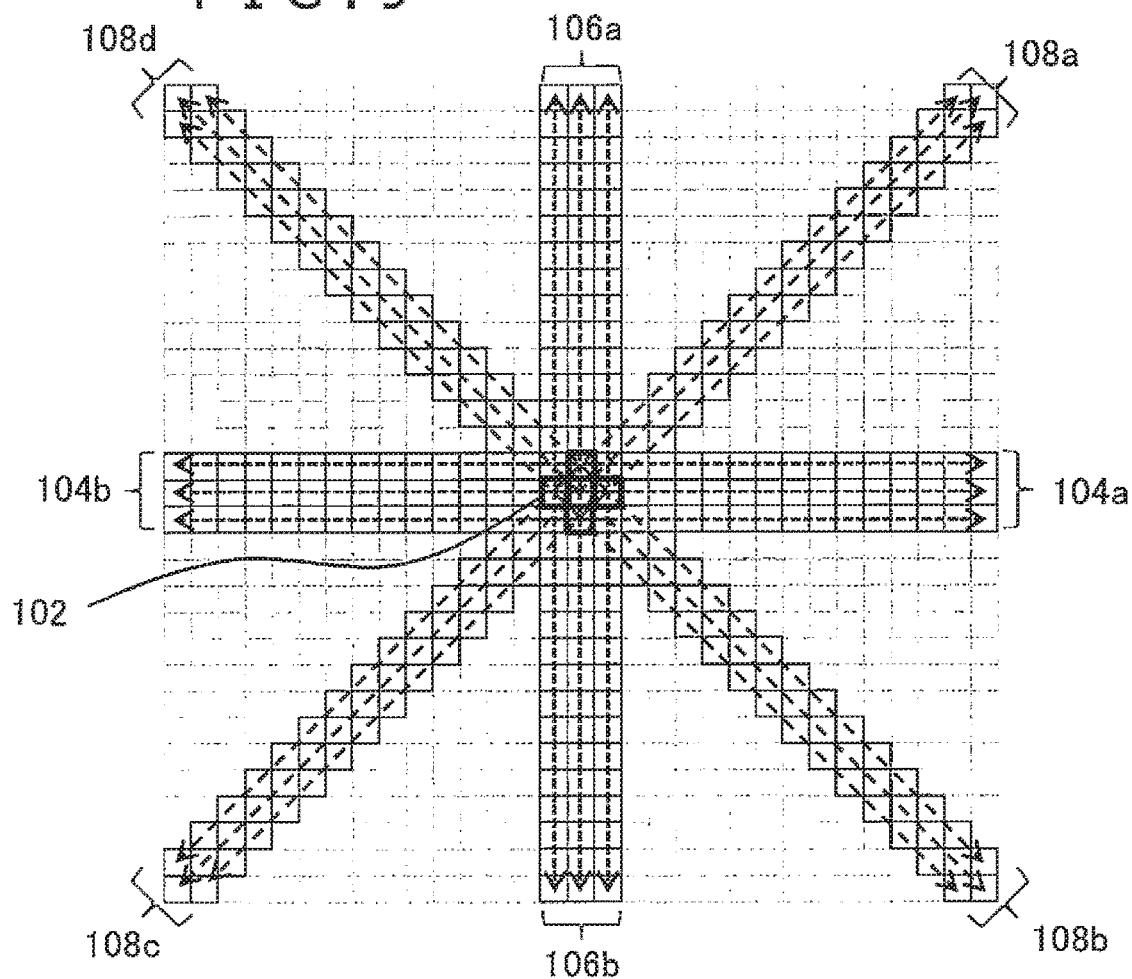

| SEARCH CENTER | SEARCH ROUTE COUNT | | | | | |
|---|---|---|---|---|---|---|
| | BG ARRAY | | RG ARRAY | | BR ARRAY | CG ARRAY |
| | HORIZONTAL | VERTICAL | HORIZONTAL | VERTICAL | DIAGONAL | DIAGONAL |
| B | 2 | 2 | 4 | 4 | 4 | 8 |
| R | 4 | 4 | 2 | 2 | 4 | 8 |
| G1 | 2 | 4 | 4 | 2 | 8 | 4 |
| G2 | 4 | 2 | 2 | 4 | 8 | 4 |

INFORMATION PROCESSING APPARATUS AND INFORMATION PROCESSING METHOD

TECHNICAL FIELD

The present invention relates to an information processing apparatus and an information processing method for identifying the position of a target object using a captured image.

BACKGROUND ART

In recent years, it has been general practice for users of personal computers, game machines and other equipment furnished with cameras to have their images captured thereby for diverse uses. For example, videophone and video chat services allow the users to transmit their unmodified images to other parties via networks. Some currently commercialized techniques enable the user's movement to be recognized through image analysis and permit the recognized movement to be used as input information for games and information processing (e.g., see Patent Literature 1). In particular, given the movement of a target object detected with high accuracy in a three-dimensional space having a depth direction, it is possible to provide games and image representations with realistic sensations.

CITATION LIST

Patent Literature

[PTL 1] WO 2007/050885 A2

SUMMARY

Technical Problem

In the case where an image is captured of a space that contains a variety of objects so that the captured image is used as input data for information processing, the accuracy of the information processing is more significantly affected by the accuracy of image analysis than if information is processed by operations using hardware keys of an input apparatus or graphic user interfaces (GUI). To implement complicated and highly accurate information processing requires detailed analysis of images in sub-pixel units.

The present invention has been made in view of the above circumstances. An object of the invention is therefore to provide techniques for detecting the position of a target object highly accurately for information processing using captured images.

Solution to Problem

In solving the above problem and according to an embodiment of the present invention, there is provided an information processing apparatus including: a captured image acquisition section configured to acquire data of an image captured of a target object; a contour search section configured to obtain a contour line of the image of the target object by searching the captured image for a coordinate point of which a change in luminance relative to the position thereof inside a region occupied by the target object image meets a predetermined condition; and a position information generation section configured to generate position information regarding the target object in the real space on the basis of the contour line. The contour search section searches for the coordinate point in a diagonal direction in an array of pixels, using a pixel in the image region as a start point.

According to another embodiment of the present invention, there is provided an information processing method including the steps of: acquiring data of an image captured of a target object so as to store the data into a memory; obtaining a contour line of the captured image of the target object by searching the captured image read from the memory for a coordinate point of which a change in luminance relative to the position thereof inside a region occupied by the target object image meets a predetermined condition; and generating position information regarding the target object in the real space on the basis of the contour line. The step of obtaining the contour line searches for the coordinate point in a diagonal direction in an array of pixels, using a pixel in the image region as a start point.

Incidentally, if other combinations of the above-outlined composing elements or the above expressions of the present invention are converted between different forms such as a method, an apparatus, a system, a recording medium, and a computer program, they still constitute effective embodiments of this invention.

Advantageous Effect of Invention

According to the present invention, the position information regarding the target object is acquired highly accurately using captured images.

BRIEF DESCRIPTION OF DRAWINGS

FIG. 4 is a block diagram depicting functional blocks of the information processing apparatus as the embodiment.

FIG. 5 is an explanatory diagram explaining the relationship between a parallax between stereoscopic images captured by the embodiment from right and left viewpoints on the one hand and the distance to the target object on the other hand.

FIG. 9 is a schematic diagram depicting an example of setting the directions of search for the contour line of the target object.

FIG. 10 is a schematic diagram schematically depicting the relationship between the contour of the target object on the one hand and the color targeted for observation with an element corresponding to each pixel in the captured image on the other hand.

DESCRIPTION OF EMBODIMENT

Figure 1:
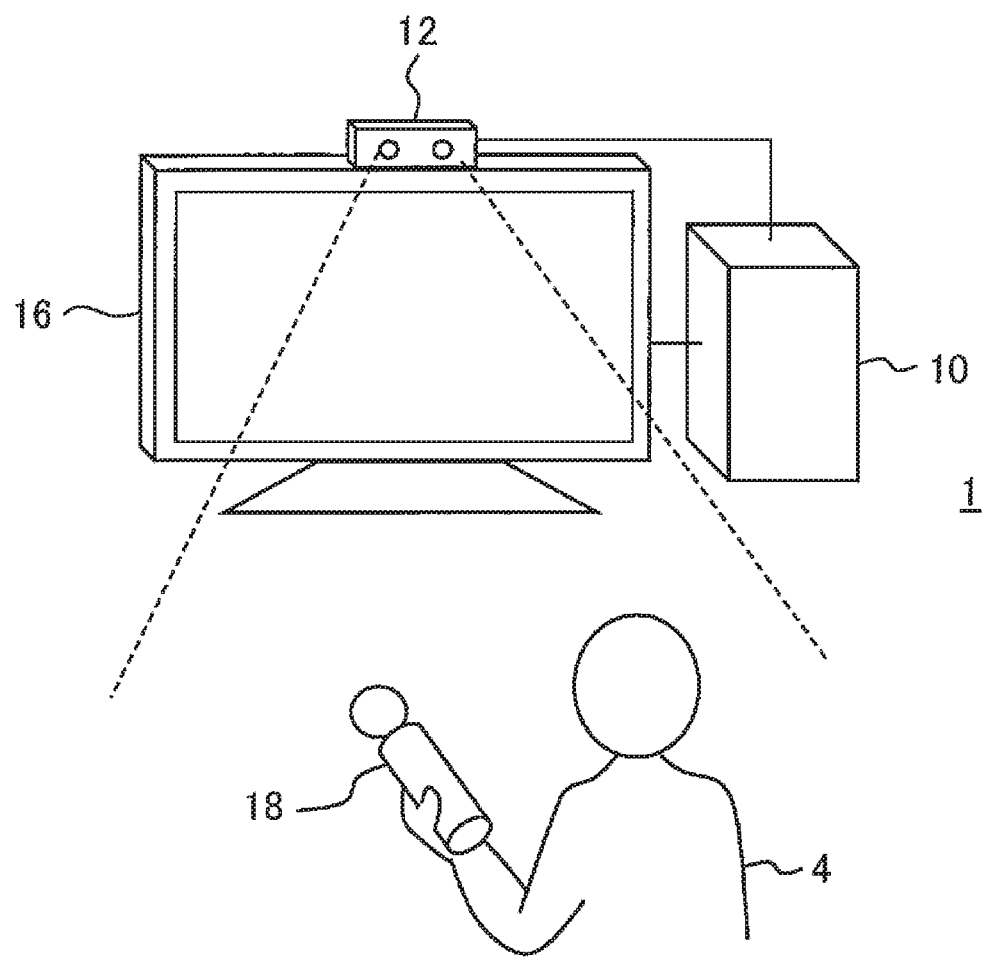
FIG. 1 is a schematic diagram depicting a typical system configuration of an information processing system embodying the present invention.

FIG. 1 depicts a typical configuration of an information processing system embodying the present invention. This information processing system 1 includes a light-emitting device 18 to be held by a user 4, an imaging apparatus 12 that captures images of a space including the light-emitting device 18, an information processing apparatus 10 that identifies the position of the light-emitting device 18 and performs information processing on the basis of the identified device position, and a display apparatus 16 that outputs data generated as the result of the information processing.

The information processing apparatus 10, imaging apparatus 12, and display apparatus 16 may be interconnected by cable or by any existing wireless communication technology such as Bluetooth (registered trademark). The external shapes of these apparatuses are not limited to those illustrated in the drawing. At least two of these apparatuses may be integrated into a single apparatus. For example, the information processing apparatus 10, imaging apparatus 12, and display apparatus 16 may be integrally implemented as a mobile terminal furnished with the corresponding functions. The imaging apparatus 12 need not necessarily be mounted on the display apparatus 16. There may be multiple users 4 depending on what is processed by the information processing apparatus 10. There may also be multiple light-emitting devices 18.

The imaging apparatus 12 has a camera that captures an image of the space including the light-emitting device 18 at a predetermined frame rate, and a mechanism that generates output data of the captured image by performing common processing such as demosaicing on an output signal from the camera before transmitting the generated output data to the information processing apparatus 10. The camera is equipped with common visible light sensors such as charge coupled device (CCD) sensors or complementary metal oxide semiconductor (CMOS) sensors.

As illustrated, there may be two such cameras spaced horizontally a known distance apart to constitute a stereo camera. The stereo camera identifies the position of the target object such as the light-emitting device 18 in a three-dimensional space that includes the distance from an imaging plane of the camera to the target object. Alternatively, the imaging apparatus 12 may be a monocular camera. The imaging apparatus 12 may output to the information processing apparatus 10 a so-called raw image including a Bayer array acquired by visible light sensors so that the information processing apparatus 10 performs necessary processing such as demosaicing on the unmodified raw image.

The information processing apparatus 10 identifies the position of the light-emitting device 18 in the real space using the data transmitted from the imaging apparatus 12. By carrying out necessary information processing based on the position information, the information processing apparatus 10 generates output data such as an image and a sound representing the result of the processing. The details of the processing performed by the information processing apparatus 10 using the position information regarding the light-emitting device 18 are not limited to anything specific. The processing details may thus be determined appropriately depending on the function desired by the user and on the details of the application in use. For example, the information processing apparatus 10 may acquire the movement of the user 4 from the movement of the light-emitting device 18 and permit progression of a game in which a character executing a similar movement appears. Also, the information processing apparatus 10 may convert the movement of the light-emitting device 18 into input commands and implement the function corresponding to the commands.

The display apparatus 16 may be a TV set that includes a display for outputting display images and speakers for outputting sounds, such as a liquid crystal TV, an organic EL TV, a plasma TV, or a PC display. Alternatively, the display apparatus 16 may be a display and speakers included in a tablet terminal or in a mobile terminal. The display apparatus 16 may be a flat-screen display such as one depicted in the drawing, a head-mounted display that presents images before the eyes of the user wearing the head-mounted display, or a combination of both the flat-screen display and the head-mounted display.

The information processing system 1 may further include an input apparatus that accepts, when operated by the user, requests for starting and ending processing and for selecting functions as well as the input of various commands, before supplying what is accepted as electrical signals to the information processing apparatus 10. The input apparatus may be any particular apparatus such as a controller, a mouse, or a joystick furnished with hardware keys, or a touch pad covering the display of the display apparatus 16.

Figure 2:
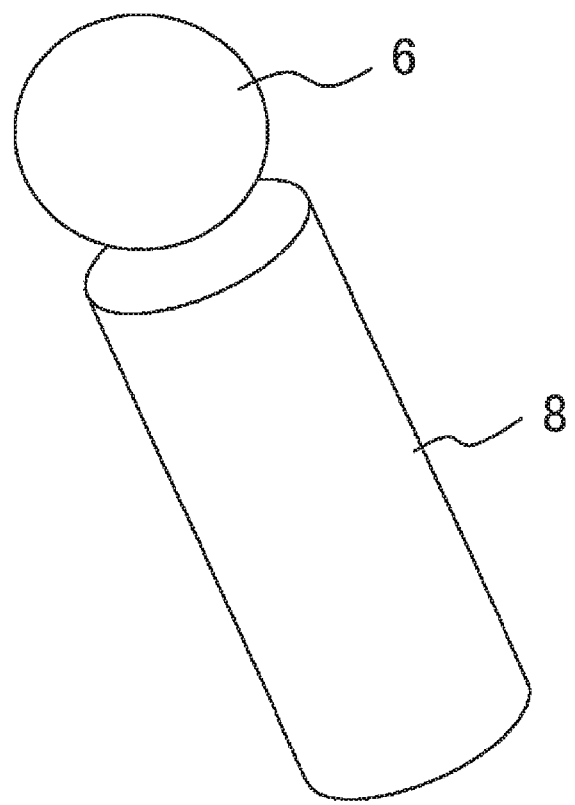
FIG. 2 is a schematic diagram depicting a typical external shape of a light-emitting device of the embodiment.

FIG. 2 depicts a typical external shape of the light-emitting device 18. The light-emitting device 18 includes a light-emitting part 6 and a handle 8. The light-emitting part 6 is a sphere formed by a cover material such as a light-transmitting resin and incorporating a common light source such as a light-emitting diode or a light bulb. The entire spherical surface emits light when the device is turned on. In the case where multiple users use their individual light-emitting devices 18, these devices are configured to emit light in different colors for individual identification.

The handle 8 is a part gripped by the user's hand and may be equipped with input buttons such as on/off buttons, not illustrated. The handle 8 may also include communication means establishing communication with the information processing apparatus 10 in wired or wireless fashion so as to exchange necessary information therewith. For example, the information processing apparatus 10 may determine emitted-light colors allocated to multiple light-emitting devices, notify each light-emitting device 18 of the emitted-light color allotted thereto, and control light-emitting modes such as lighting and blinking of the devices.

Further, the handle 8 may incorporate motion sensors such as an acceleration sensor and a gyro sensor and have their measurements transmitted from the light-emitting device 18 to the information processing apparatus 10 at a predetermined rate. This allows the information processing apparatus 10 to identify the attitude of the light-emitting device 18 successively. Incidentally, the external shape of the light-emitting device 18 is not limited to what is depicted in the drawing. Alternatively, the light-emitting device 18 may be shaped to be worn on the user's body or formed integrally with the above-described head-mounted display or input apparatus. For example, the surface of the head-mounted display or of the input device may include a light-emitting region of a predetermined shape. In this case, there may be one or multiple light-emitting regions on the surface.

This embodiment extracts the image of the light-emitting part 6 highly accurately out of an image captured of a space in which diverse objects exist, and identifies the position of the light-emitting device 18 on the basis of the position and size of the light-emitting part 6. In the case of the light-emitting device 18 illustrated in FIG. 2, the image of the light-emitting part 6 is extracted as an approximately circular region. As long as a known light source is in use, that source may be part of the input apparatus or head-mounted display of which the shape is not limited to anything specific. Although light emission from the light-emitting device 18 facilitates its distinction from the other objects within the field of view of the imaging apparatus 12, this is not limitative of this embodiment. That is, the object whose position is to be detected need only be known in terms of color and shape and is not limited to a light-emitting object. In the description that follows, the object such as the light-emitting device 18 of which the position in the real space is to be acquired on the basis of its captured image will be referred to as the "target object."

Figure 3:
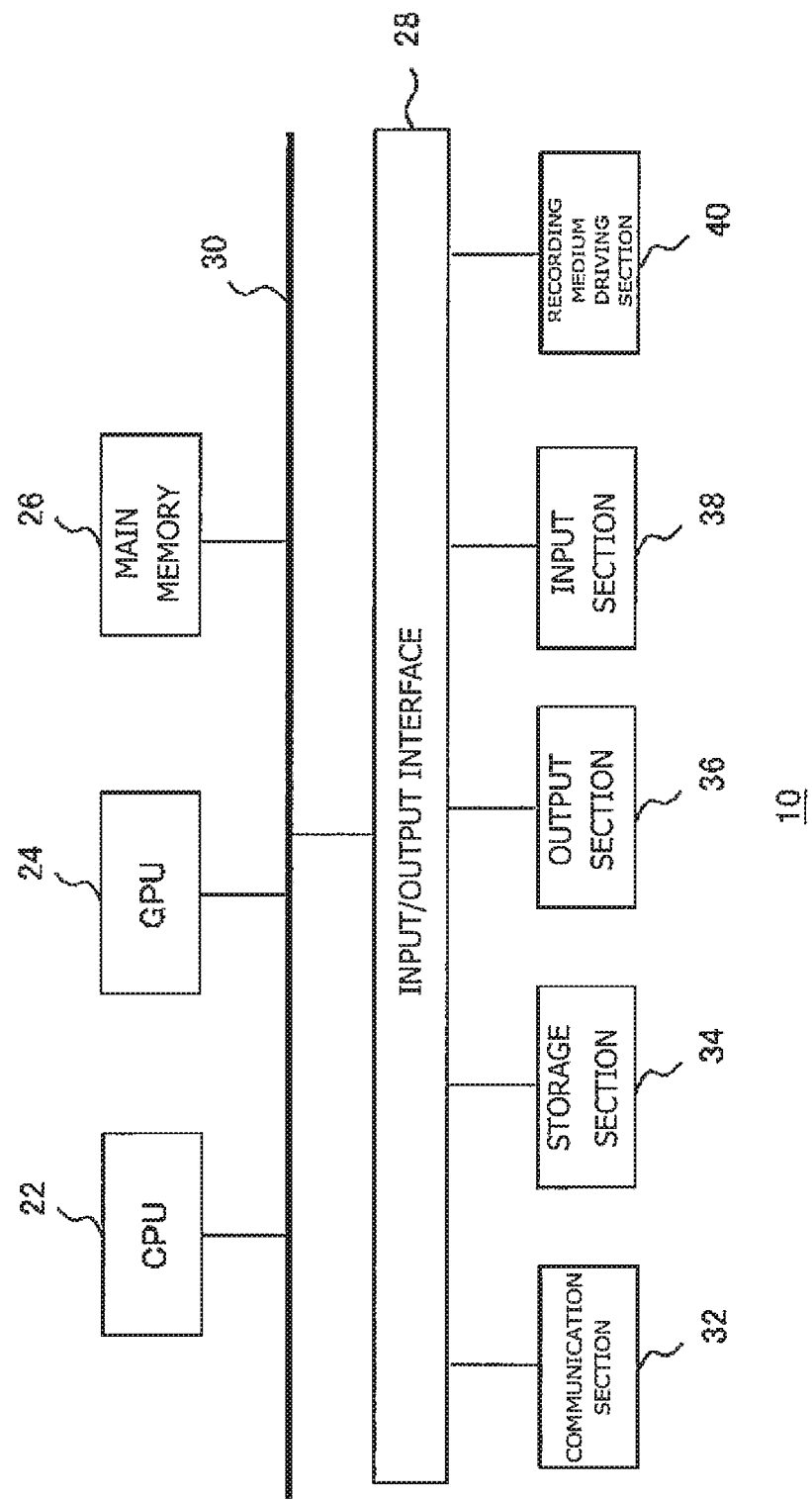
FIG. 3 is a schematic diagram depicting an internal circuit configuration of an information processing apparatus embodying the present invention.

FIG. 3 depicts an internal circuit configuration of the information processing apparatus 10. The information processing apparatus 10 includes a central processing unit (CPU) 22, a graphics processing unit (GPU) 24, and a main memory 26. These components are interconnected via a bus 30. The bus 30 is further connected with an input/output interface 28. The input/output interface 28 is connected with a communication section 32 that includes peripheral device interfaces such as USB and IEEE 1394 ports or a wired or wireless LAN network interface, a storage section 34 such as a hard disk drive or a nonvolatile memory, an output section 36 that outputs data to the display apparatus 16, an input section 38 that receives input of data from the imaging apparatus 12 and from the input apparatus, and a recording medium driving section 40 that drives removable recording media such as a magnetic disk, an optical disk, or a semiconductor memory.

The CPU 22 controls the entire information processing apparatus 10 by executing an operating system stored in the storage section 34. Also, the CPU 22 executes programs read from the removable recording media and loaded into the main memory 26 or various programs downloaded via the communication section 32. The GPU 24 having the functions of a geometry engine and a rendering processor carries out a rendering process in accordance with rendering instructions from the CPU 22 and stores a display image thus rendered into a frame buffer, not illustrated. The display image stored in the frame buffer is converted to a video signal that is output to the output section 36. The main memory 26 includes a random access memory (RAM) that stores programs and data necessary for processing.

FIG. 4 depicts a functional block configuration of the information processing apparatus 10 embodying the present invention. The information processing apparatus 10 includes a captured image acquisition section 60 that acquires data of captured images from the imaging apparatus 12, a data storage section 62 that stores captured image data and position information data, a position information acquisition section 64 that acquires position information regarding the target object in the real space by detecting its image from the captured image, an information processing section 66 that performs predetermined information processing on the basis of the position information, and an output data generation section 68 that generates the data to be output as the result of the information processing.

The elements depicted in FIG. 4 as functional blocks for executing diverse processes may be constituted in terms of hardware by various circuits such as those of the CPU 22, GPU 24, and main memory 26 in FIG. 3 or implemented in terms of software by programs loaded from the recording medium driven by the recording medium driving section 40 or from the storage section 34 into the main memory 26. It is thus understood by those skilled in the art that these functional blocks may be diversely implemented, but not limited, by hardware only, by software only, or by a combination of both.

The captured image acquisition section 60 successively acquires frame data of a moving image captured by the imaging apparatus 12 and stores the captured image into the data storage section 62. In the case where the frame image has yet to undergo a demosaicing process and shading compensation, the captured image acquisition section 60 performs such processing on the frame image before storing the image into the data storage section 62. The position information acquisition section 64 extracts an image of the target object out of the captured image read from the data storage section 62 and acquires the position information regarding the target object in the real space on the basis of the extracted image. The position information acquisition section 64 includes a target object detection section 70 that detects an approximate position of the target object image, a contour search section 72 that searches for a contour of the target object, and a position information generation section 74 that generates the position information regarding the target object in the three-dimensional space.

The target object detection section 70 detects the image of the target object from the captured image on the basis of the emitted-light color and shape of the target object. For example, there may be prepared beforehand templates of possible shapes and colors of light-emitting marker images. Then a region having a high degree of similarity to one of the templates may be detected from the captured image. The detection process performed by the target object detection section 70 need only be sufficient to detect the approximate position of the target object image. That is, the means executing the process is not limited to anything specific. The contour search section 72 searches for the contour of the target object image based on the result of the detection performed by the target object detection section 70 in order to obtain the exact position of the target object. This embodiment obtains the position of the contour with high accuracy on a sub-pixel level, thereby improving both the accuracy of acquiring the position of the target object in the real space and the accuracy of information processing by use of the position information. Specific techniques for achieving these objectives will be discussed later.

The position information generation section 74 acquires the position coordinates of the gravity center of the target object image and its size on the basis of the result of contour searches conducted by the contour search section 72. Using the gravity center position coordinates and the image size thus acquired, the position information generation section 74 identifies the position of the target object in the real space. In the case where the imaging apparatus 12 is a stereo camera, the position information generation section 74 obtains the position coordinates of the image gravity center of the same target object in each of stereoscopic images captured from right and left viewpoints. With the difference in the horizontal direction between the two image gravity centers used as a parallax, it is possible to acquire the distance from the imaging plane to the target object using the general principles of triangulation.

In the case where the target object is a marker such as the light-emitting part 6 in FIG. 2 of which the apparent size remains unchanged regardless of angles, or where the target objects are multiple markers spaced a predetermined distance apart on the device surface, a monocular camera may still be used to acquire the distance from the image size or from the marker-to-marker spacing. The position information generation section 74 identifies in this manner the distance from the imaging plane to the target object in the depth direction, represents that distance in terms of pixel values of the target object image as a region in the frame image to prepare a so-called depth map for position information digitalization for example, and stores the digitalized position information into the data storage section 62. In the case where multiple target objects exist, the position information regarding the target objects is generated by obtaining, for example, the gravity center position of each of the target objects.

The information processing section 66 reads the position information regarding the target object from the data storage section 62 and performs information processing accordingly. As mentioned above, the details of the information processing performed here are not limited to anything specific. The output data generation section 68 generates the data of the image to be displayed and the data of the sound to be output as the result of the information processing carried out by the information processing section 66. The output data generation section 68 outputs the generated data successively to the display apparatus 16.

FIG. 5 is an explanatory diagram explaining the relationship between a parallax between stereoscopic images captured from right and left viewpoints by a stereo camera used as the imaging apparatus 12 on the one hand, and the distance to the target object on the other hand. In FIG. 5, a first camera 13a and a second camera 13b are paired to constitute a stereo camera. The first camera 13a and the second camera 13b are installed to have their optical axes spaced a predetermined distance L apart in parallel with each other. Alternatively, the first camera 13a and the second camera 13b have their captured images corrected to achieve an appropriate field angle therebetween. In this example, the target object is assumed to be located in the arrowed rightmost position a distance Z apart in the depth direction.

A width $\Delta x$ represented by each of the pixels in the image captured by each camera in the real space is expressed with regard to a distance Z as follows:

$$\Delta x = Z \times w/W$$

where, W stands for the number of pixels in the horizontal direction of the camera, and w denotes a visual field range in the horizontal direction in the real space when the distance Z is 1, the visual field range w being determined by a viewing angle.

The same target object of which the images are captured by the cameras spaced a distance L apart has a parallax D therebetween in terms of pixel count defined approximately as follows:

$$D = L/\Delta x = L \times (W/w) \times (1/Z) = C/Z$$

where, C is a value determined by the cameras and their settings and is considered a constant at the tie of operation.

Figure 6:
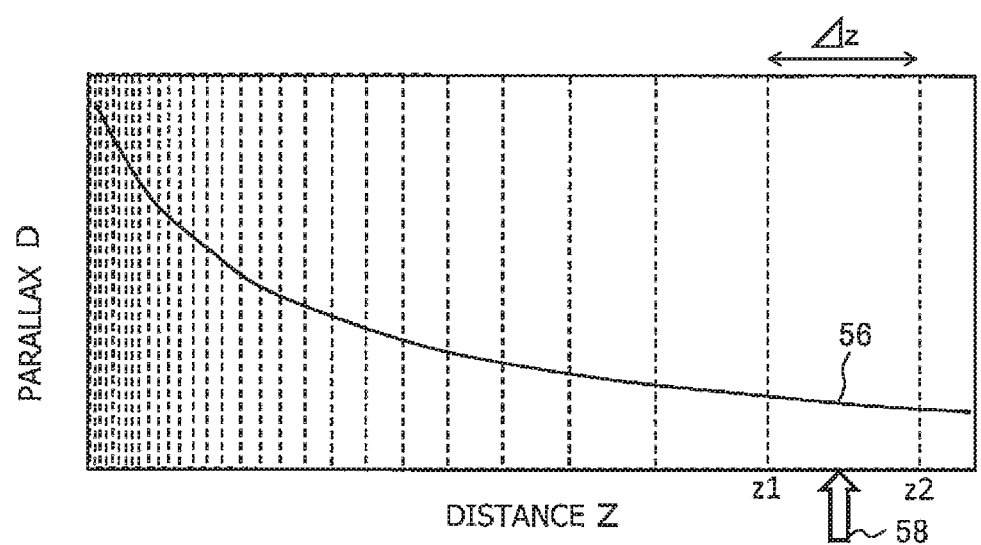
FIG. 6 is a schematic diagram depicting changes in parallax relative to distances from an imaging apparatus of the embodiment.

FIG. 6 depicts changes in the parallax D relative to the distance Z from the imaging apparatus 12. As indicated by the above equation, the parallax D plots a curve 56 in inverse proportion to the distance Z. Using this relationship makes it possible to obtain the distance Z of the target object in the depth direction based on the parallax D between the target object images from the stereoscopic images. Given that the captured images are provided as data representative of luminance in pixel units, where the position of the target object image as well as the parallax D is to be acquired also in pixel units, the distance to the target object is obtained in units of $\Delta z$ as follows:

$$\Delta z = \Delta x \times Z/L = Z^2 \times (w/W) \times (1/L)$$

That is, in the case where the units in which the position of the target object is obtained are fixed, the resolution of the distance Z to the target object drops in proportion to the distance Z squared. The spacing between vertical dotted lines in the graph in FIG. 6 represents $\Delta z$. For example, even where the target object is located in the position indicated by an arrow 58, if the image position is identified in pixel units, the distance Z is calculated as z1 or as z2 including an error of up to approximately $\Delta z$. That is, the farther the target object is away from the imaging apparatus 12, the greater the adverse effect on the accuracy of distance calculation due to the error in acquiring the image position from the captured images.

Also in the case where a monocular camera is used as the imaging apparatus 12 so that the distance is derived from the size of the target object image, it remains unchanged that the farther the target object is away from the imaging apparatus 12, the larger the error in distance calculation due to even a small amount of divergence in size. A large error included in the distance can result in a significant error of the position coordinates of the target object in the three-dimensional space, the coordinates being obtained by back projection from an image plane. This error may conceivably affect subsequent information processing in a non-negligible manner. Thus the contour search section 72 of this embodiment aims to improve the accuracy of acquiring the position information regarding the target object in the real space by obtaining the contour line of the image accurately on a sub-pixel level.

Figure 7:
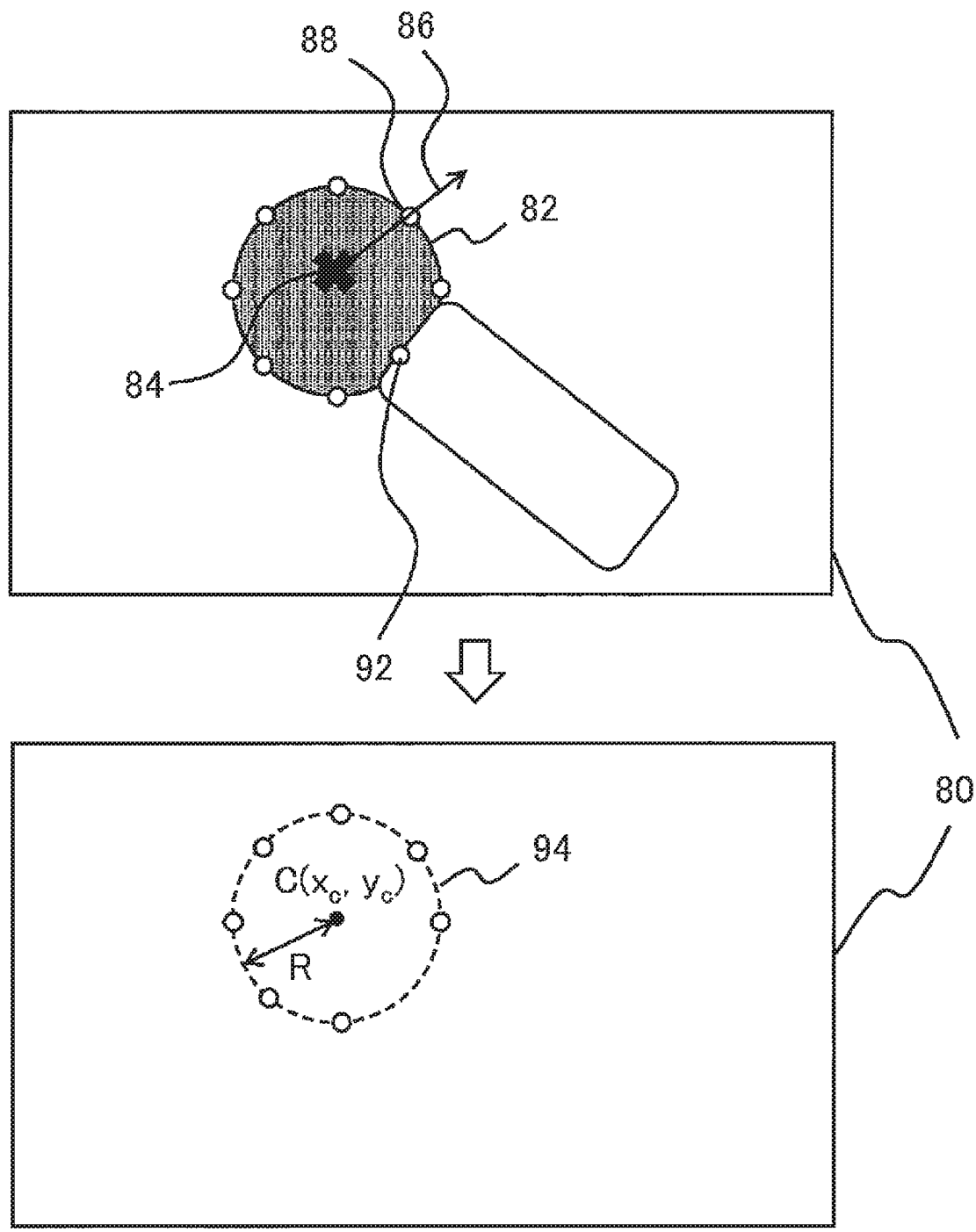
FIG. 7 is an explanatory diagram explaining a method by which a contour search section of the embodiment identifies the contour of the image of the target object.

FIG. 7 is an explanatory diagram explaining a method by which the contour search section 72 of this embodiment identifies the contour of the image of the target object. The target object detection section 70 extracts the region of a target object image 82 from a captured image 80 using a common method such as template matching or foreground extraction. The extraction process may be done in pixel units or in units of something larger to give precedence to efficiency. On the basis of the result of the extraction process, the contour search section 72 determines the start point of a search route and its direction in order to search for the contour position of the image. Qualitatively, the contour search section 72 performs a search from inner side to outer side of the target object image and determines that a contour exists in the positions where luminance changes abruptly.

For example, a coordinate point 88 on the contour line is obtained by sampling pixel values from a start point 84 in the direction of an arrow 86. This search is performed in multiple directions to obtain multiple coordinate points on the contour line. Whereas FIG. 7 indicates the coordinate points thus obtained as hollow circles, they only represent position coordinates on the image plane and do not represent a captured image. The contour search section 72 approximates these multiple coordinate points using common techniques such as the least-square method to acquire the contour line of the target object image as a mathematical formula on the image plane.

In the case where the target object is a spherical light-emitting marker, its image appears circular. Thus a contour line 94 of the image is obtained as a circle using the circular approximation method. Where the distribution of position coordinates is detected to have overall distortion such as elliptical distortion at the time of approximation, the coordinate points are corrected using a common correction filter. If there exists any coordinate point having a large error deviating from an approximation formula, that point is excluded so that the coordinate points are made ultimately to converge on the approximation formula. In the illustrated example, a coordinate point 92 detected in a position hidden by the handle of the light-emitting device and thus deviating from the normal contour of the light-emitting marker is eliminated.

The coordinate points to be removed can occur as a result of being hidden by some other object, or due to an error in coordinate point detection. The center coordinates $C(x_c, y_c)$ of a circle of the contour line 94 thus obtained represent the gravity center of the image of the light-emitting marker as the target object, with a radius R of the circle indicating the size of the image. The position information generation section 74 uses these pieces of data to obtain the position of the target object in the real space as described above. Incidentally, it is to be understood by those skilled in the art that the approximation of a set of coordinate points to lines and the acquisition of the gravity center and size of the target object image are accomplished by diverse techniques and that the shape of the target object is thus not limited to anything specific.

That is, even if the target object has any shape other than the sphere, as long as the shape of the target object image is limited, the information regarding the target object may be set beforehand in order to ultimately determine its shape with the approximation line having the least error. With the shape thus determined, the technique for obtaining the gravity center and size of the target object image is uniquely determined. Alternatively, the shape of the image obtained until up to the preceding frame of the captured moving image may be used as the basis for estimating the subsequent shape of the image, the estimated image being used for the approximation.

Figure 8:
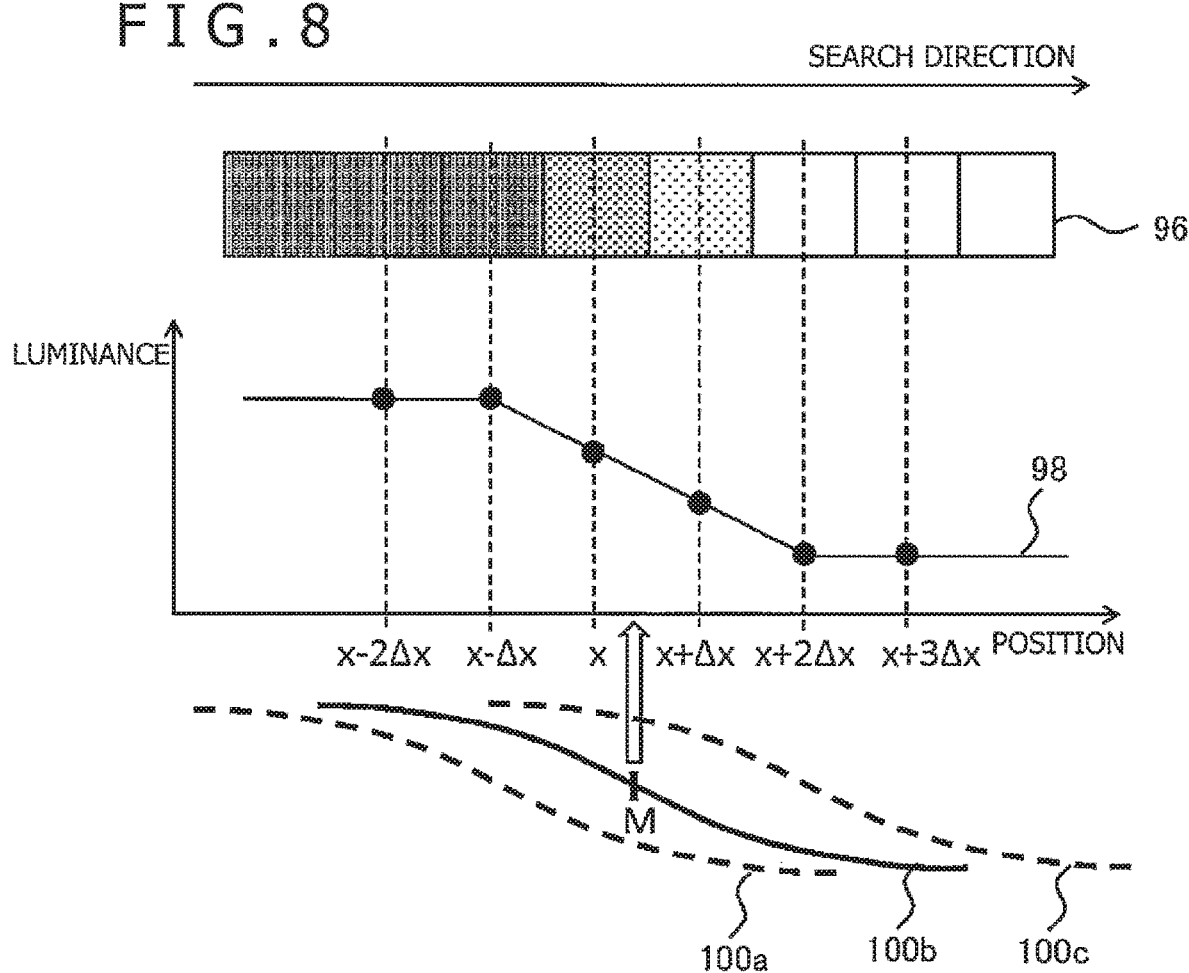
FIG. 8 is an explanatory diagram explaining a method by which the embodiment detects the position of a contour line with a higher resolution than the resolution of pixels on the basis of changes in luminance in the direction of search.

The coordinate points or position coordinates on the contour line detected by the contour search section 72 and the position coordinates of the gravity center based on the detected coordinate points are acquired at a higher resolution than the resolution of the pixels. FIG. 8 is an explanatory diagram explaining a method by which the embodiment detects the position of a contour line at a higher resolution than the resolution of pixels on the basis of changes in luminance in the direction of search. If the rightward direction in FIG. 8 is assumed to be the search direction, a pixel sequence 96 is formed by extracting pixels from the search route and by arraying the extracted pixels. Each of the pixels in the pixel sequence 96 has a luminance value. Where the changes in luminance between the pixels are represented as changes relative to their positions on the search route, these changes constitute a graph 98, for example.

Normally, luminance values are obtained in pixel units. Thus if the width of a pixel in the search direction is represented by $\Delta x$, then the graph 98 is formed by connecting discrete luminance values obtained with respect to positions $x-2\Delta x$, $x-\Delta x$, $x$, $x+\Delta x$, $x+2\Delta x$, $x+3\Delta x$, etc. With such changes in luminance normalized for example, a previously prepared predictable luminance change curve is parallelly translated to form predictable curves such as curves 100a, 100b and 100c for comparison therebetween.

The state in which the degree of similarity is highest between these curves is identified on the basis of the total sum of differences therebetween, for example. The reference position such as a midpoint M on the predictable curve 100b in that state is used as the position of the contour line of the target object. In FIG. 8, that position is indicated by a hollow arrow.

The predictable curve is translated in units smaller than the width $\Delta x$ of each pixel for a sort of the matching process. This allows the position of the contour line to be identified in units smaller than the pixel width. On the other hand, even if each coordinate point on the contour line is detected in this manner in sub-pixel units, any detected point that includes a large error will result in a greater error in the position information regarding the target object in the real space the farther the target object is located, as was discussed above. For example, where the target object is 2 meters away from the imaging apparatus 12, a deviation of only 0.5 pixels in the detected position of the gravity center leads to a deviation of approximately 3 centimeters of the distance calculated through stereo matching. This can lead to a motionless target object being erroneously recognized as in motion.

Under the above circumstances, the inventors realized that there exist the following issues regarding the search routes for the contour line where position detection on a sub-pixel level is to be performed with high accuracy:
(1) The resolution and accuracy of coordinate point detection vary depending on the search direction.
(2) The credibility of luminance data varies depending on the colors of pixels normally observed on the search routes.

What follows is an explanation of the issue (1) above. FIG. 9 depicts an example of setting the directions of search. In FIG. 9, each rectangle in grid represents a pixel. Broken-line arrows denote the search routes and their directions. In this example, 24 searches are performed radially starting from one pixel in a pixel group 102 estimated to be near the center of the target object image identified approximately by the target object detection section 70. That is, as indicated by arrow groups 104a and 104b, three searches are made rightward and leftward starting from the pixel group 102 for a total of 6 searches. Also as indicated by arrow groups 106a and 106b, three searches are carried out upward and downward starting from the pixel group 102 for a total of 6 searches.

Furthermore, as indicated by arrow groups 108a, 108b, 108c and 108d, three searches are performed in the top right direction, bottom right direction, bottom left direction, and top left direction, respectively, from the pixel group 102 for a total of 12 searches. Given these settings, there occurs dependence of the resolution and accuracy of coordinate point detection on direction, as mentioned in connection with the issue (1) above. That is, as depicted in FIG. 8 where each coordinate point formed by a horizontal component and a vertical component on the image plane is detected by translating the predictable luminance change curve in the search direction, the horizontal searches indicated by the arrow groups 104a and 104b allow the horizontal components to be determined in sub-pixel units but cause the vertical components to be acquired in pixel units.

The vertical searches indicated by the arrow groups 106a and 106b allow the vertical components to be determined in sub-pixel units but cause the horizontal components to be acquired in pixel units. That is, during the searches in the horizontal and vertical directions, there occurs an error of up to one pixel in the position coordinates in the vertical or horizontal direction. Meanwhile, the searches in the diagonal directions indicated by the arrow groups 108a, 108b, 108c and 108d allow both the vertical and horizontal components to be determined in sub-pixel units. However, because the pixel-to-pixel spacing in the search direction, i.e., $\Delta x$ in FIG. 8, is approximately 1.4 times that of the searches in the vertical and horizontal directions, there occurs an error of approximately up to 0.7 pixels (=1.4/2) in the position coordinates in both directions.

What follows is an explanation of the issue (2) above. As described above, the captured image targeted for analysis is generated by interpolating through a demosaicing process the raw image in which each pixel retains luminance data of one color. Thus each of the pixels in the captured image generated in this manner includes an error stemming from the interpolation process. How the error is included varies from one pixel to another depending on the color targeted for observation with the corresponding element. FIG. 10 schematically depicts the relationship between the contour of the target object on the one hand and the color targeted for observation with the element corresponding to each pixel in the captured image on the other hand. In a captured image 112, each rectangle in grid represents a single pixel. The colors of red, green and blue targeted for observation with the corresponding elements are noted as "R," "G" and "B," respectively. Similar notations will also be used hereunder.

The array of colors in the drawing is what is commonly called the Bayer array. However, this array is not limitative of this embodiment. When the coordinate points on a contour line 114 of the target object image are to be searched for as described above, the credibility of the detected coordinate points varies depending on the combination of such factors as the initial colors targeted for observation with the pixels on the search route, the change in luminance of a specific color for discriminating a coordinate point, and the colors of the target object. For example, whereas the pixels on the search route indicated by arrow A constitute a pattern of colors "R," "B," "R," "B," etc., for observation, the pixels on the search route indicated by arrow B all have the color "G" for observation.

At this point, where coordinate points on the contour line 114 are to be detected using the changes in luminance of the color G, the information regarding the color G on the search route indicated by arrow A includes an error due to interpolation. Thus the result from the search route indicated by arrow B is more credible. However, even in the case of the search route indicated by arrow B, detecting coordinate points using the changes in luminance of the color R or B causes the information regarding the color to develop an error on the route. That means the credibility is lower than if coordinate points are detected using the changes in luminance of the color G.

Figure 11:
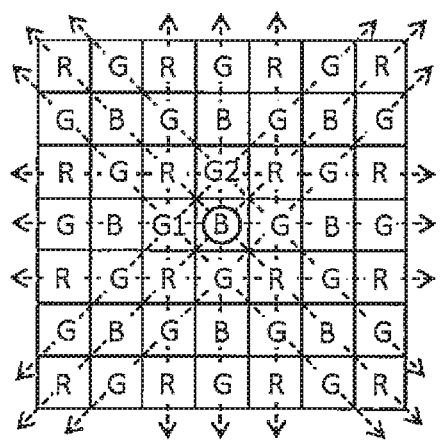
FIG. 11 is a tabular diagram indicating search route counts given when search routes similar to those in FIG. 9 are grouped by the patterns of the colors targeted for observation with pixels positioned on the routes.

FIG. 11 indicates search route counts given when search routes similar to those in FIG. 9 are grouped by the patterns of the colors targeted for observation with the pixels positioned on the routes. Where the search routes are set in a manner centering on the color B as depicted in the lower subfigure in FIG. 11, there are two horizontal searches and two vertical searches for a "BG array" having the colors B and G repeated as the target for observation with pixels on the routes. There are four horizontal searches and four vertical searches for an "RG array" having the colors R and G repeated. There are eight diagonal searches for a "BR array" having the colors B and R repeated. Further, there are eight diagonal searches for a "GG array" having solely the color G repeated.

Likewise, even in the case where the center of the search route is R or G, the "BG array" and "RG array" appear when searched for in the vertical and horizontal directions, and the "BR array" and "GG array" appear when searched for in the diagonal directions. In this manner, the rate at which the color array appears varies depending on the search direction. Also, the rate of appearance for the combination of the color array and the search direction varies depending on the color targeted for observation with the pixel at the search center. In the case where the search center is G, the rate of appearance varies depending on whether the pixel is either to the right or left of B, or above or below B. In FIG. 11, the former case is noted as "G1" and the latter case as "G2" as indicated in the lower subfigure.

As described above, where the routes are set as illustrated, the credibility of the data in use varies from one search route to another. The methods of calculation such as the least-square method are based on the assumption that the initial data of interest is uniform in characteristics. Thus if the errors of detected coordinate points vary in characteristics depending on the search route, there is a possibility that the approximate accuracy of the contour line, and eventually the accuracy of acquiring the gravity center position and size, may not be sufficiently high. Because the search center is determined for each frame based on the result of detection performed by the target object detection section 70, the results of calculating the gravity center position and size may well vary from one frame to another due to changes in the rate of dependence on the search center as depicted in FIG. 11. Given these findings, this embodiment sets the search routes in such a manner that the error characteristics of coordinate points remain unchanged between search routes and between frames.

Figure 12:
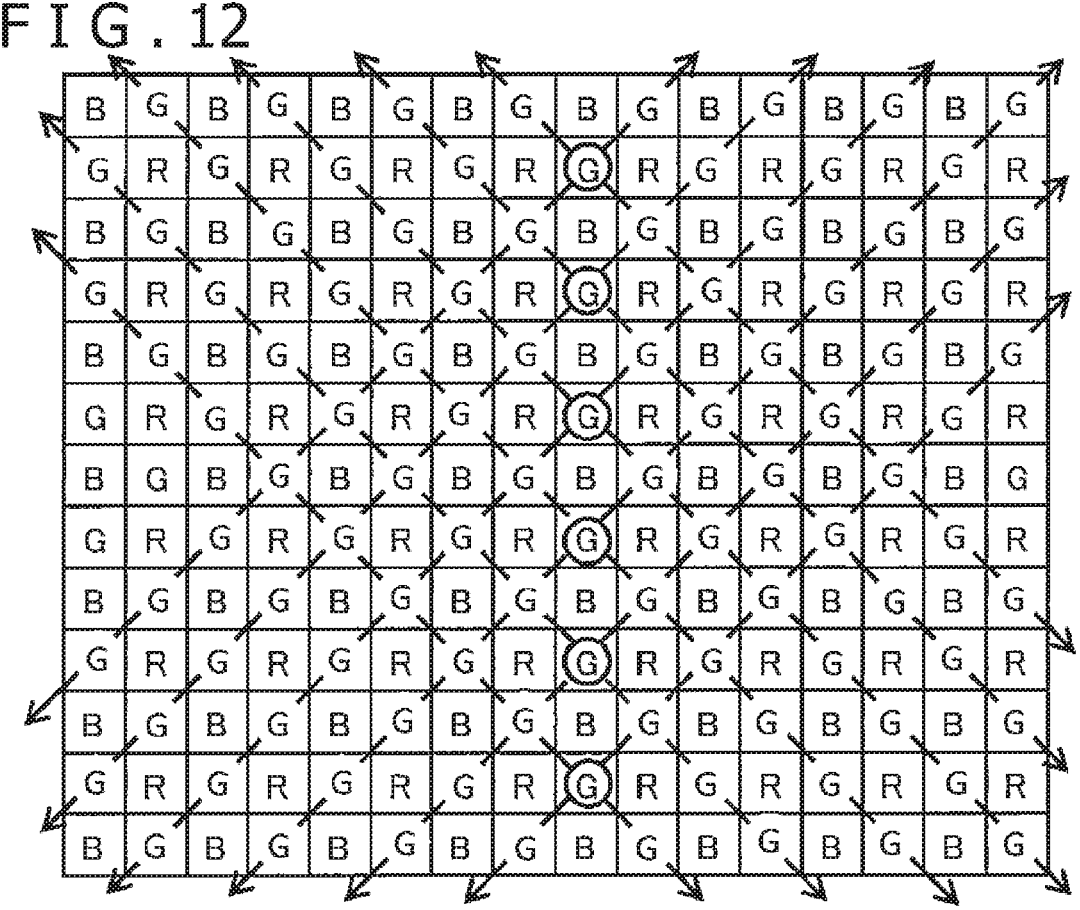
FIG. 12 is a schematic diagram schematically depicting search routes used by the embodiment in searching for the contour line of the target object.

FIG. 12 schematically depicts search routes used by the embodiment searching for the contour line of the target object. As indicated by broken-line arrows in the drawing, the embodiment performs searches starting from the pixels for observing the color G, the searches being limited to the diagonal directions in the pixel array. That is, searches are made from pixels set as the start points in a manner tracking pixels to observe the same color G in the top right, bottom right, bottom left, and top left directions. Where searches are performed on 24 routes as in the case depicted in FIG. 9, six start points may be established as indicated by hollow circles in FIG. 12.

At this point, duplication and skewed distribution of the search routes are averted by selecting as the start points those pixels of which the observation target is G and which are in the same sequence in the vertical or horizontal direction on the image plane as illustrated. The start points need only be positioned within an approximate region of the target object image detected by the target object detection section 70. Preferably, the center of the start point sequence may be set near the gravity center of the region. In the illustrated example, the vertically closest G pixels, e.g., every other pixel, are set as the start points. However, this is not limitative of the spacing of the start points. The start point spacing may be adjusted depending on the size of the target object image, for example. The number of searches may also be adjusted in accordance with the accuracy requirement and the processing performance of the apparatus in use.

Setting the search routes in this manner resolves the issues (1) and (2) above. That is, all search routes are in the diagonal directions of the pixel array, so that the vertical and horizontal components of the detected coordinate points are obtained in sub-pixel units and that the error characteristics are the same for all search routes. Because all pixels on the search routes have their observation target uniformly set to G, the color that includes the error and the extent thereof are uniform. As a result, the detected coordinate points are always uniform in characteristics, so that the contour line approximated by the least-square method and the position coordinates of the gravity center detected accordingly are obtained accurately and stably.

If a spherical target object is assumed, the gravity center of its image may be identified by conducting 24 searches as depicted in FIG. 12 with an error of approximately 0.016 pixels. Given the same number of searches, the accuracy of the target object position acquired in this manner is at least three times as high as in the case where searches are made in three directions, i.e., vertical, horizontal and diagonal, as depicted in FIG. 9, to obtain coordinate points on the basis of the changes in luminance of each of the colors R, G and B.

Using the search routes in FIG. 12 resolves the issues (1) and (2) above appropriately and at the same time. It is also possible to resolve the issue (1) alone by limiting the search routes to the diagonal directions. If the search start points are limited to R or to B, the pixels on the search routes still have a uniform color array targeted for observation, so that the error characteristics of the detected coordinate points are substantially uniform. As a result, the accuracy of approximating the contour line is made higher than in the case where the start point pixels are not limited.

Figure 13:
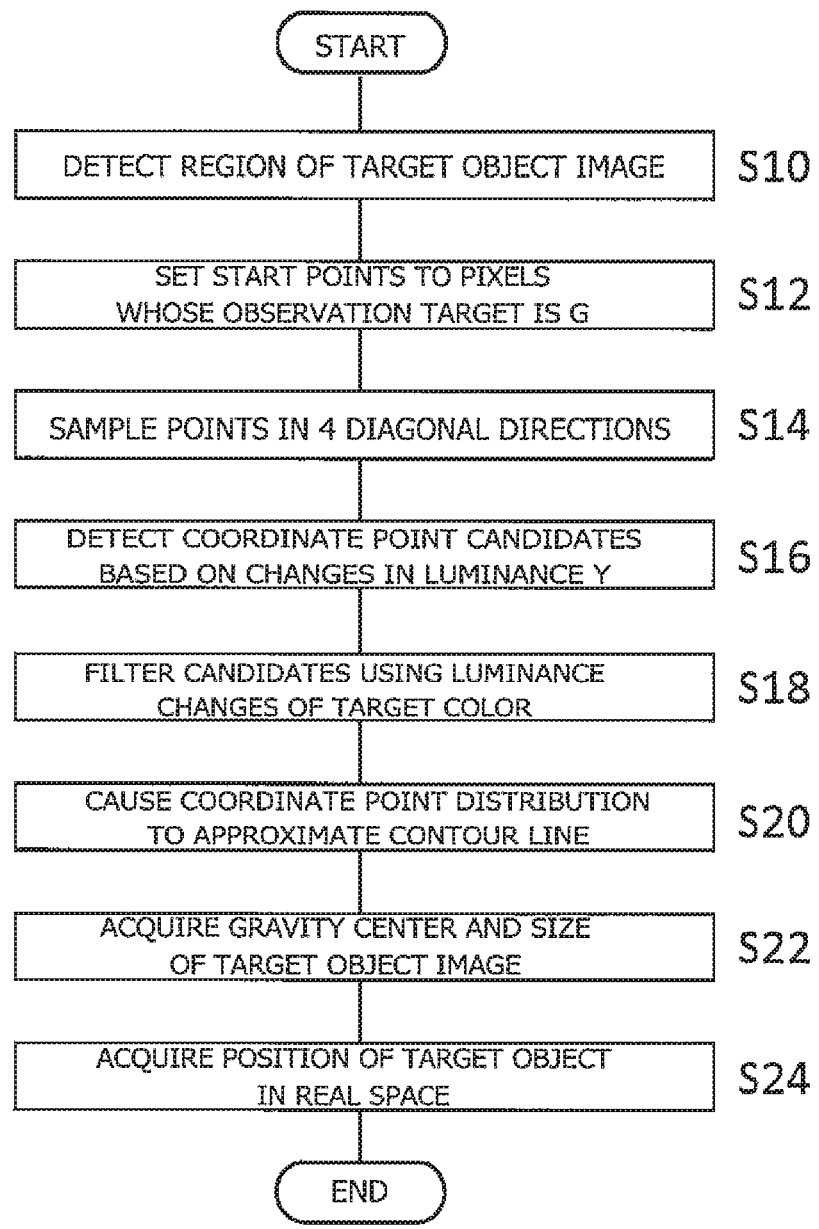
FIG. 13 is a flowchart indicating processing steps in which a position information acquisition section of the information processing apparatus embodying the present invention acquires the position information regarding the target object.

Below is an explanation of the workings of the information processing apparatus implemented using the above-described configuration. FIG. 13 is a flowchart indicating processing steps in which the position information acquisition section 64 of the information processing apparatus 10 acquires the position information regarding the target object. First, the target object detection section 70 detects from the captured image the region of a target object image through template matching, for example (S10). The captured image used at this point is typically an RGB image having undergone demosaicing.

Next, the contour search section 72 determines as the search start points those pixels of which the observation target for the corresponding elements is G in the region (S12). In the example of FIG. 12, every other pixel is selected in the vertical direction for a total of six start points. It is to be noted that the pixel-to-pixel spacing and the number of start points may be adjusted as needed. The information associating the pixels in the captured image with the colors for observation with the corresponding elements is acquired beforehand and retained internally by the contour search section 72. This is array information regarding arrays such as the Bayer array depicted in the captured image 112 in FIG. 10 for example.

In the case where the relationship of correspondence between the colors targeted for observation and the pixels has yet to be obtained, the relationship may be acquired through a calibration process that takes advantage of the detection result error being small. For example, an image is captured of the target object located a predetermined distance from the imaging apparatus 12. The search start point is then moved one pixel at a time up, down, right, and left for searches in the diagonal directions in order to obtain the contour line in each direction. The position of the target object is calculated under different search conditions. It is then determined that the start point with the smallest error is the position in which there exists a pixel whose observation target is G. When at least one such pixel is identified, it is possible to associate the pixels with the colors targeted for observation throughout the entire captured image on the basis of a repeating pattern such as the Bayer array.

The contour search section 72 then performs searches in the four diagonal directions starting from the pixels determined as the start points so a to detect coordinate points on the contour line (S14 to S18). Specifically, the luminance values of the pixels on the search routes are sampled and stored into a line buffer (S14). In the example of FIG. 12, the sampling is conducted in the four directions from the six start points for a total of 24 sampling sequences. Coordinate point candidates on the contour line are first detected on the basis of changes in luminance Y along each sampling sequence (S16). Specifically, as depicted in FIG. 8, the predictable curve is positionally translated to determine the position in which the degree of similarity to a graph of changes in the luminance Y is the highest. That position is used as the coordinate point candidate.

Here, the luminance Y is the component of the luminance at the time each pixel value represented in the color space of YUV. As such, the luminance Y is obtained from RGB data using a common conversion formula. The conversion may be performed after the RGB values are sampled in step S14. Alternatively, the conversion may be carried out on the entire captured image at the time the data of the captured image is acquired or is demosaiced, and a luminance image resulting from the conversion may be targeted for sampling. The luminance Y is targeted for evaluation at the time of coordinate point detection for two reasons: because the contribution ratio is highest for G with the smallest error on the search routes, and because the luminance includes information regarding R and B of nearby pixels due to interpolation. This makes it possible to take into consideration more information than if a single color is targeted, and enables implementation of the evaluation with high and uniform accuracy.

The contour search section 72 then filters the coordinate point candidates detected in step S16 using the luminance changes in the color component of the target object, and excludes the coordinate points of low credibility (S18). For example, in the case where a marker that emits light in red is the target object, the evaluation is performed using the luminance of R. Where a marker that emits light in magenta is the target object, the evaluation is done using the luminance of the magenta component. If solely the changes in the luminance Y are targeted for the evaluation, coordinate points might be detected erroneously under the influence of the surrounding environment. For example, in the case where a light source such as a window or a lighting device is located near the contour of the target object when viewed from the imaging apparatus 12, the human eye easily distinguishes the target object but the apparatus may have difficulty in clearly identifying the boundary between the target object and the nearby light source given only the changes in the luminance Y.

As a result, there is a possibility that coordinate points may be detected in positions deviating from the contour. These coordinate points incorrectly detected due to changes in the initial color of the target object are thus excluded. For example, in the sequence of a predetermined number of pixels positioned before and after a coordinate point candidate in the search direction, if the change in luminance of the color component of the target object is below a predetermined range, that coordinate point candidate is evaluated to be inside the target object image and not on the contour and thus excluded. Alternatively, if the difference in luminance of the color component of the target object between the sequence of a predetermined number of pixels positioned before a coordinate point candidate and the pixel at a search start point is larger than a predetermined threshold value, that coordinate point is evaluated to be outside the target object image and is thus excluded as well.

The process of detecting coordinate point candidates using the luminance Y and the process of excluding coordinate point candidates using the luminance of the color of the target object may be performed in different steps as illustrated, or may be carried out at the same time. For example, the sampling sequence of the luminance Y on the search route and the sampling sequence of the luminance of the color of the target object are calculated in the same position so as to form a data sequence. This data sequence is matched against the predictable curve to identify coordinate points of high credibility. When a group of coordinate points is determined in this manner, the contour search section 72 causes the distribution of the coordinate points to approximate the line of the predictable shape using the least-square method, thereby determining the contour of the target object image (S20).

At this point, as explained above with reference to FIG. 7, the distribution of the coordinate points may be corrected on the basis of distortion on the image, and the coordinate points deviating significantly from the approximate line may be further excluded. The position information generation section 74 acquires the gravity center and size of the target object image based on the contour line thus identified (S22). Where the target object is a sphere as depicted in FIG. 7, the contour line of the image forms a circular shape. Thus the center and radius of the circle are obtained. The position information generation section 74 then acquires the position information regarding the target object in the real space on the basis of the gravity center and size of the target object image (S24). In the case where the imaging apparatus 12 is a stereo camera, the processing of S10 to S22 is performed on each of the images captured from right and left viewpoints. The parallax between the gravity center positions then permits acquisition of the distance to the target object.

In the case where the imaging apparatus 12 is a monocular camera, the distance to the target object is acquired by comparing the actual size of the target object with the size of its image. Where multiple target objects with different emitted-light colors are inside the field of view of the imaging apparatus 12, the processing of S10 to S24 is performed on each of the target objects. Also, changes over time in the position of the target object are obtained by repeating the processing of S10 to S24 on each of the frames of the moving image captured by the imaging apparatus 12 at a predetermined rate. The information processing section 66 performs information processing appropriately by identifying typically the position and movement of the user on the basis of the position information thus obtained regarding the target object.

According to the embodiment described above, when the position of the target object is detected using the captured image, the contour of the target object image is detected by searching for luminance from within the image. In this case, a pixel of which the corresponding element targets G (green) for observing luminance is used as a start point from which searches are made in the four diagonal directions of the pixel array. This makes it possible to provide the same resolution for the vertical and horizontal components of the coordinate points on the contour line detected by a single search. Also, the spacing for obtaining luminance on all search routes is made the same, with the errors in the luminance made equal. Thus the accuracy is equalized for the detected coordinate points. Consequently, the contour line of the target object is obtained easily and accurately using a statistical approximate method such as the least-square method.

Also, because the coordinate points are detected on the basis of the changes in the luminance Y in the YUV color space, the evaluation that additionally takes R (red) and B (blue) into account is made possible with emphasis on the luminance of G having a minimum of luminance error. Further, coordinate point candidates are filtered using the changes in color luminance of the target object so as to improve the reliability of the coordinate points for use in approximation. This guarantees the robustness of the coordinate points being reliable against changes in ambient brightness. These processes allow a common visible light camera for discretely detecting the luminance of each of R, G and B to acquire the contour line of the target object image with high accuracy on a sub-pixel level. By utilizing the contour line thus obtained and the gravity center and size of the target object image identified thereby, it is possible to obtain the position of the target object in the real space efficiently and highly accurately.

The present invention has been described above in conjunction with a specific embodiment. It is to be understood by those skilled in the art that suitable combinations of the constituent elements and various processes of the embodiment described above as an example will lead to further variations of the present invention and that such variations also fall within the scope of this invention.

REFERENCE SIGNS LIST

6 Light-emitting part
1 Information processing system
10 Information processing apparatus
12 Imaging apparatus
16 Display apparatus
18 Light-emitting device
22 CPU
24 GPU
26 Main memory
60 Captured image acquisition section
62 Data storage section
64 Position information acquisition section
66 Information processing section
68 Output data generation section
70 Target object detection section
72 Contour search section
74 Position information generation section

INDUSTRIAL APPLICABILITY

As described above, the present invention may be applied to information processing apparatuses such as game machines, image processing apparatuses and personal computers, as well as to information processing systems that include any one of these apparatuses.

The invention claimed is:

1. An information processing apparatus comprising:
a captured image acquisition section configured to acquire data of a captured image of a target object in an extracted image region;
a contour search section configured to obtain a contour line of the image of the target object by searching the captured image for a coordinate point of which a change in luminance relative to a position inside the captured image of the target object in the extracted image region meets a predetermined condition; and
a position information generation section configured to determine the position of the target object in a real space on the basis of the contour line, wherein the contour search section searches for the coordinate point along a search route in a diagonal direction in an array of pixels inside the captured image of the target object in the extracted image region, using a pixel inside the captured image of the target object in the extracted image region as a start point.

2. The information processing apparatus according to claim 1, wherein the captured image acquisition section acquires data of a color image formed by color-interpolating luminance data obtained using a Bayer array on an image plane; and the contour search section uses a plurality of pixels having the same color in the initial Bayer array as search start points.

3. The information processing apparatus according to claim 2, wherein the contour search section uses pixels having the color of green in the initial Bayer array as search start points.

4. The information processing apparatus according to claim 1, wherein the contour search section performs searches in a plurality of diagonal directions to obtain the contour line by causing the distribution of the detected coordinate points to approximate a predictable shape of the target object image using a least-square method.

5. The information processing apparatus according to claim 1, wherein the contour search section detects the coordinate point at least on the basis of a change in luminance Y relative to the position of the coordinate point in a YUV space representing the colors of the pixels on a search route.

6. The information processing apparatus according to claim 5, wherein the contour search section filters the coordinate point on the basis of a change in the luminance of a color component of the target object from among the colors of the pixels on the search route.

7. The information processing apparatus according to claim 1, wherein the captured image acquisition section acquires data of stereoscopic images captured of the target object from right and left viewpoints; and the position information generation section calculates a gravity center of each of the stereoscopic images of the target object on the basis of the contour line, and generates the position information based on a parallax between the gravity centers of the stereoscopic images.

8. The information processing apparatus according to claim 1, wherein the position information generation section calculates a size of the target object image based on the contour line, and generates the position information by comparing the calculated size with an actual size of the target object.

9. The information processing apparatus according to claim 2, wherein the contour search section translates the start point from one pixel to another to obtain the contour line for each start point in the captured image of the target object at a known distance from an imaging apparatus, and identifies the pixel to be used as the start point of the search on the basis of an error in the resulting position information.

10. An information processing method comprising:

acquiring data of a captured image of a target object in an extracted image region so as to store the data into a memory;

obtaining a contour line of the captured image of the target object by searching the captured image read from the memory for a coordinate point of which a change in luminance relative to a position inside the captured image of the target object in the extracted image region meets a predetermined condition; and determining the position of a target object in a real space on the basis of the contour line, wherein the obtaining the contour line searches for the coordinate point along a search route in a diagonal direction in an array of pixels inside the captured image of the target object in the extracted image region, using a pixel inside the captured image of the target object in the extracted image region as a start point.

11. A non-transitory, computer-readable storage medium containing a computer program, which when executed by a computer, causes the computer to carry out actions, comprising:

acquiring data of a captured image of a target object in an extracted image region;

obtaining a contour line of the captured image of the target object by searching the captured image read from the memory for a coordinate point of which a change in luminance relative to a position inside the captured image of the target object in the extracted image region meets a predetermined condition; and determining the position of a target object in a real space on the basis of the contour line, wherein the obtaining the contour line searches for the coordinate point along a search route in a diagonal direction in an array of pixels inside the captured image of the target object in the extracted image region, using a pixel inside the captured image of the target object in the extracted image region as a start point.

12. The information processing apparatus according to claim 4, wherein one of the plurality of directions comprises a path of pixels having a pattern of different colors and another direction comprises a path of pixels having a single color.

* * * * *